Nov. 7, 1950   C. L. KOPPLIN ET AL   2,529,342
EXTENSION HANDLE FOR SHOVELS AND THE LIKE
Filed April 19, 1948
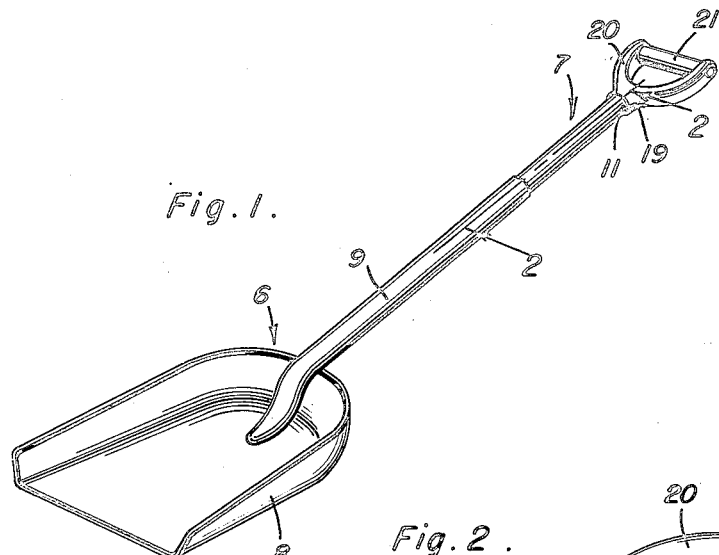
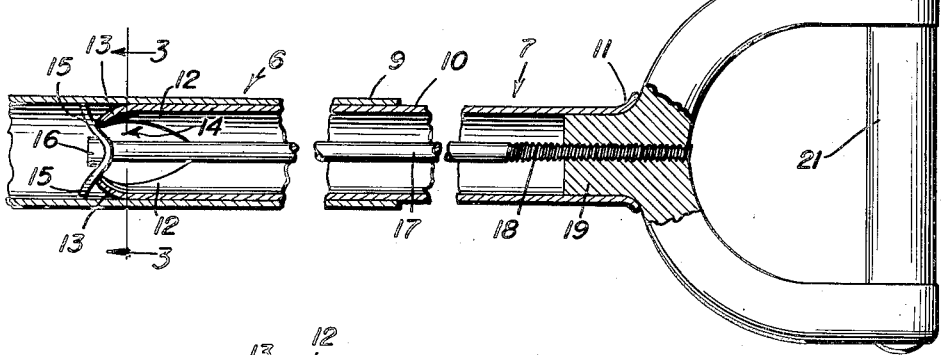
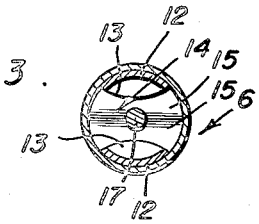
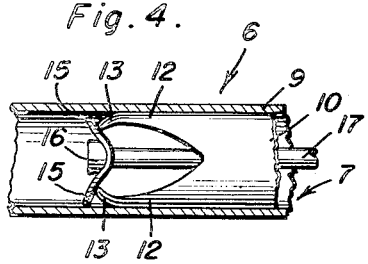
Clarence L. Kopplin
Paul C. Kopplin
INVENTORS.

Patented Nov. 7, 1950

2,529,342

UNITED STATES PATENT OFFICE 2,529,342

EXTENSION HANDLE FOR SHOVELS AND THE LIKE

Clarence L. Kopplin and Paul C. Kopplin, Waterloo, Iowa

Application April 19, 1948, Serial No. 21,904

2 Claims. (Cl. 294—57)

The present invention relates to a novel and improved extensible and retractible handle construction which is especially, but not necessarily, adapted for use on shovels, spades, pitchforks and the like.

As the introductory statement of the invention implies, we are aware that implement handles, which are susceptible of being lengthened or shortened according to requirements and for compactness and convenience of storage and transportation, are not new. Therefore, in carrying out the principles of the present invention, we contemplate the provision of an adjustable handle which, compared to similarly devised extension handles, is possessed of appreciable refinements and improvements which, collectively considered, serve to provide a novel contribution to this line of endeavor.

Briefly, in carrying out our invention, we provide a handle made up of telescopically connected tubular sections, one section being provided with a fork-type hand-grip which serves to actuate a cam-equipped spreader, said spreader acting upon friction-held detents, whereby to provide a simple, practical and satisfactory means for holding the sections in adjusted position.

Another object of the invention is to provide a handle of the aforementioned construction, wherein the hand-grip provides the means for adjusting the sections to desired relative positions, and when rotated, serves to either loosen or tighten the means which serves to retain said sections in relatively fixed relationship.

Other objects, features and advantages will become more readily apparent from the following description and the accompanying drawings.

In the drawings:

Figure 1 is a perspective view of a conventional type of shovel equipped with an extensible and retractible handle, constructed in accordance with the principles of the present invention.

Figure 2 is a view on an enlarged scale and in section and elevation, said view showing, fragmentarily, all of the essential parts of our improvements, taken on the line 2—2 of Figure 1, looking in the direction of the arrows.

Figure 3 is a cross-section on the line 3—3 of Figure 2, looking in the direction of the arrows.

Figure 4 is a fragmentary sectional and elevational view, showing the spreader and retaining means.

Referring now to the drawings by distinguishing reference characters, it will be seen that the invention is characterized mainly by two essential units, the unit 6 and complemental unit 7.

The first-named unit comprises a shovel or equivalent part 8 and an integral tubular shank 9, which constitutes one of the handle sections. The unit 7 comprises the part which is extensible and retractible in relation to the shank section 9. It is characterized essentially by a tubular section which may be conveniently referred to as a sleeve 10, and this telescoped into the section 9. The outer end of the sleeve is flared as at 11 and the inner end is bifurcated and the furcations define resilient spreadable and contractible friction-retained prongs 12, the terminal ends of said prongs being toed inwardly toward each other, as at 13, to provide for the desired camming action of the spreader 14. The spreader takes the form of a suitably bent and shaped washer, whose centrally apertured portion is bent and curved in the manner shown and whose end portions 15 conform to and fit firmly and slidably within the bore of the shank section 9. The ends 15 are so bent that they provide cams and said cams cooperate with the prong terminals 13 for purposes of either spreading or releasing same, as the case may be. The headed end 16 of a bolt 17 passes through the central apertured portion of the cam washer or spreader, and the screw-threaded shank of said bolt is screwed into what may be described as a nut 19, forming a part of the fork 20. The fork carries the customary round 21 and the nut-portion 19 fits slidably and rotatably into the flared end portion of the sleeve 10.

It is obvious that the prongs 12 provide friction detents which are forced into binding relation with the bore of the shank section 9, this by the action of the cam spreader on the prong tips or terminals 13. The prongs have a normal or natural tendency to spring toward each other, so that when the cam lock is released, they are disengaged and permit free telescopic action of the sections 9 and 10.

When the cam lock is off, the entire unit 7, by way of the hand-grip, may be slid in or out to either lengthen or shorten the handle. The hand-grip may also be turned to bring the cam action into play, and to temporarily lock the sections 9 and 10 together.

In reviewing the disclosure, it will be noted that the unit 6 is made up of two parts, a head structure 8 and an integral tubular shank section 9. The unit 7 fits telescopically, by way of the section 10 or sleeve, into the shank section and said sleeve carries all of the essential operating parts, that is, the hand-grip means at the outer end, and the spreadable and retractible cam and friction retaining means on the inner end. Thus, the one hand-grip serves to lengthen and shorten the sectional shank and, when it is turned in relation to the section 10, serves to either lock or unlock the spreadable and retractible cam-actuated locking means.

A careful consideration of the foregoing description in conjunction with the invention as illustrated in the drawings, will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

1. An implement of the class shown and described comprising a head provided with an integral tubular shank section, an extension unit embodying a tubular shank section in the form of an open ended sleeve and fitted telescopically and slidably into said first-named shank section, the inner end of said sleeve being bifurcated, the furcations defining resilient prongs and the terminal ends of said prongs being deflected laterally and toed inwardly toward each other, an elongated bolt extending centrally and axially through and beyond opposite ends of said sleeve, said bolt having a headed end adjacent said prongs, a washer mounted on the headed end of the bolt, said washer having a centrally bent portion which is located between the prongs and having end portions defining cams on diametrically opposite sides of the bent portion, the terminals of said prongs having wiping and camming contact with said prongs, and hand grip means having a screw-threaded nut portion fitted telescopically into the outer end of said sleeve, the screw-threaded end of said bolt being screwed into said nut portion.

2. An extension unit for use in a tubular shank section embodying a shank section in the form of an open-ended sleeve, the inner end of said sleeve being bifurcations, the furcations thus provided defining spring prongs and the tip ends of said prongs being laterally bent and toed inwardly toward each other, a bolt extending centrally and axially through and beyond opposite ends of said sleeve, said bolt having a headed end adjacent said prongs, a washer mounted on the headed end of said bolt and having end portions defining diametrically opposite cams and an intervening central bend, said bend being situated between the tip ends of said prongs and said tip ends having wiping and camming contact with said cams and the free outer end portions of the cams being in projecting positions to contact a tubular shank section in which said sleeve is adapted to be fitted telescopically, the outer end of said sleeve being flared, a fork-type hand grip having a screw-threaded portion fitted into said flared sleeve-end and constituting a nut, the screw-threaded end of said bolt being adjustably joined with said nut.

CLARENCE L. KOPPLIN.
PAUL C. KOPPLIN.

REFERENCES CITED

The following references are of record in the file of this patent:

UNITED STATES PATENTS

| Number | Name | Date |
| --- | --- | --- |
| 617,831 | Irish et al. | Jan. 17, 1899 |
| 622,766 | Harris | Apr. 11, 1899 |
| 808,992 | Lawson | Jan. 2, 1906 |
| 1,177,072 | Warman | Mar. 28, 1916 |
| 1,177,073 | Warman | Mar. 28, 1916 |
| 1,830,223 | Bushnell | Nov. 4, 1930 |